US012154468B2

(12) United States Patent
Shiobara et al.

(10) Patent No.: US 12,154,468 B2
(45) Date of Patent: Nov. 26, 2024

(54) DISPLAY DEVICE

(71) Applicant: SHARP KABUSHIKI KAISHA, Sakai (JP)

(72) Inventors: Naoki Shiobara, Sakai (JP); Masafumi Ueno, Sakai (JP); Masaaki Moriya, Sakai (JP); Masafumi Kawai, Sakai (JP); Mohammad Reza Kazemi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/288,271

(22) PCT Filed: May 21, 2021

(86) PCT No.: PCT/JP2021/019278

§ 371 (c)(1),
(2) Date: Oct. 25, 2023

(87) PCT Pub. No.: WO2022/244220

PCT Pub. Date: Nov. 24, 2022

(65) Prior Publication Data

US 2024/0221551 A1 Jul. 4, 2024

(51) Int. Cl.
*G09G 3/00* (2006.01)
*G09G 3/3233* (2016.01)

(52) U.S. Cl.
CPC ........... *G09G 3/006* (2013.01); *G09G 3/3233* (2013.01); *G09G 2300/0842* (2013.01); *G09G 2320/041* (2013.01); *G09G 2320/045* (2013.01); *G09G 2330/12* (2013.01)

(58) Field of Classification Search
CPC ..... H10K 59/00–095; G09G 2320/041; G09G 2320/043; G09G 2320/045
See application file for complete search history.

(56) References Cited

U.S. PATENT DOCUMENTS

2007/0103411 A1* 5/2007 Cok .................... G09G 3/3225 345/82
2008/0055209 A1 3/2008 Cok
2008/0055210 A1 3/2008 Cok
2016/0150623 A1 5/2016 Uemura et al.
2016/0300534 A1* 10/2016 Kishi .................. G09G 3/3283

FOREIGN PATENT DOCUMENTS

JP 2009-515219 A 4/2009
JP 2016-100548 A 5/2016
WO 2015/093097 A1 6/2015

* cited by examiner

*Primary Examiner* — Sanjiv D. Patel
(74) *Attorney, Agent, or Firm* — ScienBiziP, P.C.

(57) ABSTRACT

A display device includes a display panel, a temperature sensor, a characteristics measuring unit, a correction value computation unit, a correction processing unit, and a display control unit. A plurality of pixel circuits include, as an element, a light-emitting element; and a drive transistor configured to control an electric current that flows in the light-emitting element. The characteristics measuring unit obtains the measurement value when the temperature is in a predetermined temperature range and does not obtain the measurement value when the temperature is out of the temperature range.

10 Claims, 11 Drawing Sheets

DISPLAY DEVICE

TECHNICAL FIELD

The present disclosure relates to display devices.

BACKGROUND ART

Corrections are made in some cases to maintain the light intensity of a light-emitting element at a constant value in response to, temperature and decay. Patent Literature 1 describes a light-emitting device that makes a correction on the basis of cumulative light-emission time. Specifically, the light-emitting device disclosed in Patent Literature 1 includes a light-emitting element. This light-emitting device detects ambient temperature for the light-emitting element. The light-emitting device also stores a setting-drive signal for causing the light-emitting element to emit light. The setting-drive signal is corrected using a correction coefficient in accordance with the ambient temperature. This correction enables calculating a drive signal for causing the light-emitting element to emit light with a target light intensity. The correction coefficient varies for each target light intensity. In addition, a decay level is calculated using any of an accumulated light-emission time for each ambient temperature, an accumulated light-emission time for each drive signal, and an accumulated light-emission time for each combination of various values of the ambient temperature and various values of the drive signal. Additionally, the correction coefficient varies for each decay level.

CITATION LIST

Patent Literature

Patent Literature 1: Japanese Unexamined Patent Application Publication, Tokukai, No. 2016-100548

SUMMARY

Technical Problem

A display device may include a plurality of pixel circuits. For example, a pixel circuit includes a light-emitting element and a transistor for controlling turning on/off of the light-emitting element. An organic EL element (OLED: organic light-emitting diode) may be used as a light-emitting element. The electrical characteristics of the light-emitting element and the transistor in the pixel circuit may change over the course of the use thereof. Then, voltage- or current-related characteristics may be measured to correct the voltage and/or current applied to the pixel circuit. Elements in the pixel circuit are however also under the influence of temperature. A suitable correction amount cannot be determined from a measurement value, depending on temperature at the time of the measurement value. For example, when temperature is so low as to limit electric current, measurement may be so severely affected by noise that the obtained correction amount can be inappropriate.

The present disclosure, in one aspect thereof, has an object to provide a display device that so limits the temperature range in which to measure a characteristic of an element in a pixel circuit so as to reduce instances of measurement to obtain a suitable correction value, thereby maintaining high image quality.

Solution to Problem

The present disclosure, in one aspect thereof, is directed to a display device including: a display panel including a plurality of pixel circuits; a temperature sensor configured to measure temperature of the display panel; a characteristics measuring unit configured to obtain a measurement value related to a characteristic of an element in the plurality of pixel circuits by passing an electric current through the plurality of pixel circuits; a correction value computation unit configured to, when the characteristics measuring unit has obtained the measurement value, determine a correction value for a temporal change based on the measurement value; a correction processing unit configured to obtain a correction voltage value by correcting a video signal based on the correction value; and a display control unit configured to cause a voltage that has a value equal to the correction voltage value to be applied to the plurality of pixel circuits, wherein the plurality of pixel circuits include, as the element: a light-emitting element; and a drive transistor configured to control an electric current that flows in the light-emitting element, and the characteristics measuring unit obtains the measurement value when the temperature is in a predetermined temperature range and does not obtain the measurement value when the temperature is out of the temperature range.

DESCRIPTION OF EMBODIMENTS

Figure 1:
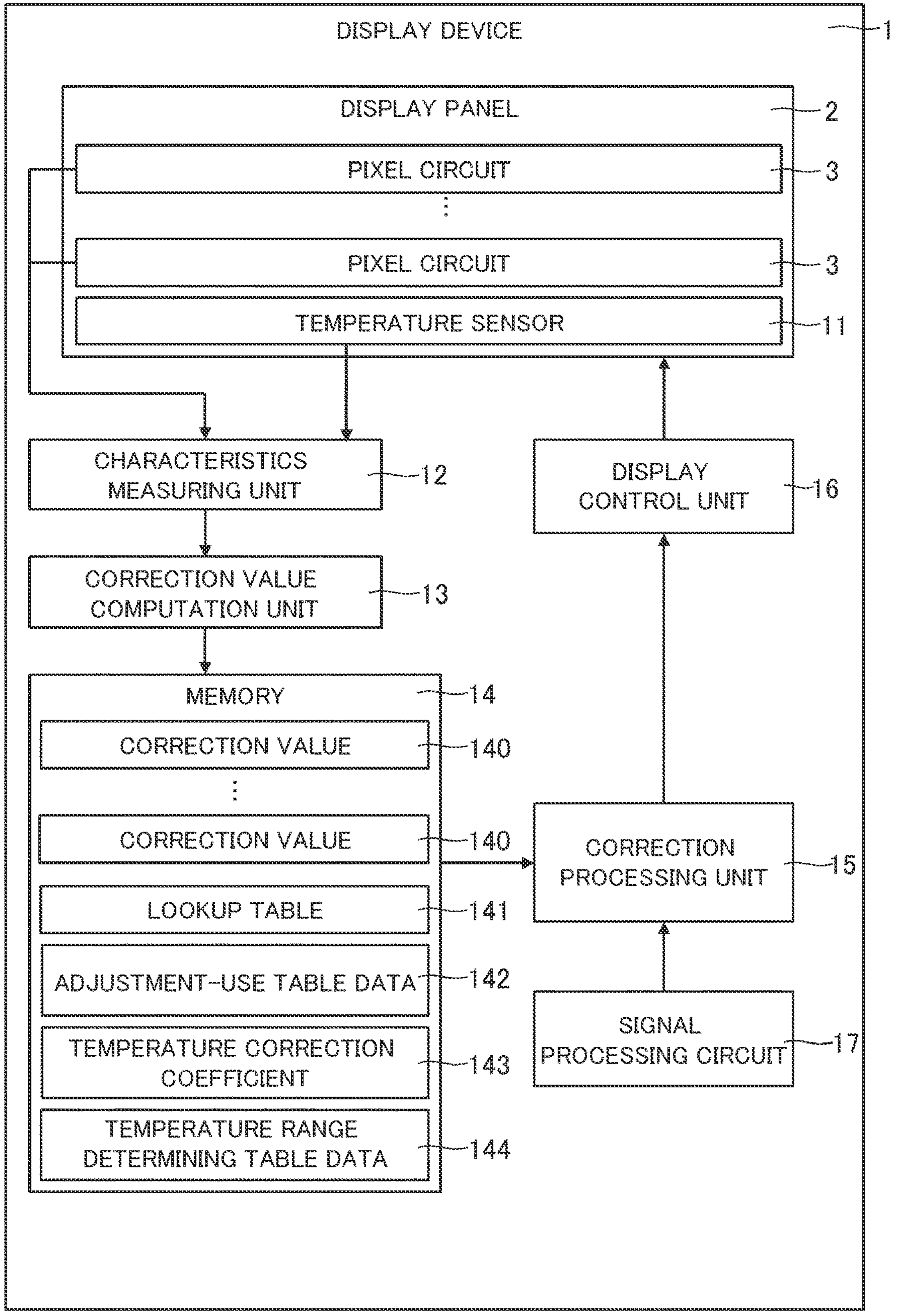
FIG. 1 is a diagram of an exemplary display device in accordance with an embodiment.

The following will describe an aspect of a display device 1 in accordance with the present disclosure with reference to drawings. It should be understood however that the following embodiments and variation examples are for illustrative purposes only and by no means limit the scope of the disclosure. Note that identical and equivalent elements in the drawings are denoted by the same reference numerals.

Display Device 1

A description is given of an aspect of the display device 1 with reference to FIG. 1. FIG. 1 is a diagram of an example of the display device 1 in accordance with the embodiment. Referring to FIG. 1, the display device 1 includes a temperature sensor 11, a characteristics measuring unit 12, a correction value computation unit 13, a memory 14, a correction processing unit 15, a display control unit 16, and a display panel 2. The display device 1 may include a signal processing circuit 17.

The display panel 2 includes a plurality of pixel circuits 3. Each pixel circuit 3 includes, as elements, at least a light-emitting element L1 and a plurality of transistors. One of the plurality of transistors is a drive transistor T2 for controlling the electric current that flows in the light-emitting element L1. The light-emitting element L1 is, for example, an OLED (organic light-emitting diode). The light-emitting element L1 may be another type of current-driven light-emitting element. The transistors are, for example, TFTs (thin film transistors). Note that the transistors may be of a type that has a channel layer of amorphous silicon, a type that has a channel layer of low-temperature polysilicon, or a type that has a channel layer of an oxide semiconductor. For example, the oxide semiconductor may be an indium-gallium-zinc oxide (IGZO). In addition, the transistors may have either a top gate structure or a bottom gate structure. Additionally, the transistors may be of either an n-channel type or a p-channel type. The following description will assume use of transistors of an n-channel type. Note that if transistors of a p-channel type are used, the signal and voltage levels (logic) are reversed.

The temperature sensor 11 measures the temperature of the display panel 2. For example, the temperature sensor 11 is a circuit with a thermistor. Referring to FIG. 1, the temperature sensor 11 may be disposed inside the display panel 2. Note that the temperature sensor 11 may be disposed outside the display panel 2. The temperature sensor 11 outputs a voltage in accordance with the temperature of the display panel 2. The output of the temperature sensor 11 is fed to the characteristics measuring unit 12. The characteristics measuring unit 12 recognizes (senses) the temperature of the display panel 2 on the basis of the output of the temperature sensor 11.

The characteristics measuring unit 12 causes an electric current to flow through the pixel circuit 3. The characteristics measuring unit 12 then obtains a measurement value representing the electrical characteristics of an element in the pixel circuit 3. For example, the characteristics measuring unit 12 measures the voltage-current characteristics of the element. The characteristics measuring unit 12 may obtain either a measurement value related to the light-emitting element L1 or a measurement value related to the transistor. The measurement will be detailed later. The characteristics measuring unit 12 may be a circuit that includes circuitry and elements for measuring (monitoring) the electrical characteristics of an element. In other words, a characteristics measurement circuit may be provided as the characteristics measuring unit 12.

The correction value computation unit 13 determines a correction value 140 for temporal changes on the basis of a measurement value. For example, the correction value computation unit 13 may be a circuit for obtaining the correction value 140 by performing a computation on the basis of a measurement value. In other words, a correction value computation circuit may be provided as the correction value computation unit 13. The correction value computation unit 13 computes the correction value 140 for each pixel circuit 3. The correction value 140 is used in video signal correction.

The memory 14 is a recording medium for storing data in a non-volatile fashion. For example, the memory 14 is a flash ROM. The memory 14 contains the correction value 140 obtained by the correction value computation unit 13 in a non-volatile fashion. The memory 14 contains the correction value 140 for each pixel circuit 3. The signal processing circuit 17 acquires a video signal, an audio signal, an auxiliary signal, and a control signal from the data fed from a source device. The video signal includes a gray level (pixel data) for instructing a luminance level to each pixel circuit 3 (light-emitting element L1). The signal processing circuit 17 feeds the acquired video signal to the correction processing unit 15.

The correction processing unit 15 corrects a video signal on the basis of the correction value 140 to obtain a correction voltage value V1. The correction processing unit 15 obtains the correction voltage value V1 for each pixel circuit 3. The correction voltage value V1 is a voltage value obtained by correcting a data voltage Vd that has a magnitude corresponding to the gray level of the video signal. For example, the correction processing unit 15 is a circuit that performs a computation to obtains the correction voltage value V1. In other words, a correction processing circuit may be provided as the correction processing unit 15.

The display control unit 16 drives the pixel circuit 3 by causing a voltage with a value equal to the correction voltage value V1 to be applied to the pixel circuit 3 (drive transistor T2). The drive transistor T2 passes an electric current that is in accordance with the magnitude of the correction voltage value V1. Specifically, the display control unit 16 causes a voltage with a magnitude equal to the correction voltage value V1 to be applied to a data line D (details will be given later). The voltage on the data line D is applied to the gate of the drive transistor T2. The display control unit 16 hence controls the luminance of each light-emitting element L1. The display control unit 16 is a display control circuit (driver circuit) that outputs, to the display panel 2, a signal for selecting pixel circuits 3, applying a voltage to each pixel circuit 3, and controlling the turning on/off and luminance of the light-emitting element L1.

Display Panel 2

Figure 2:
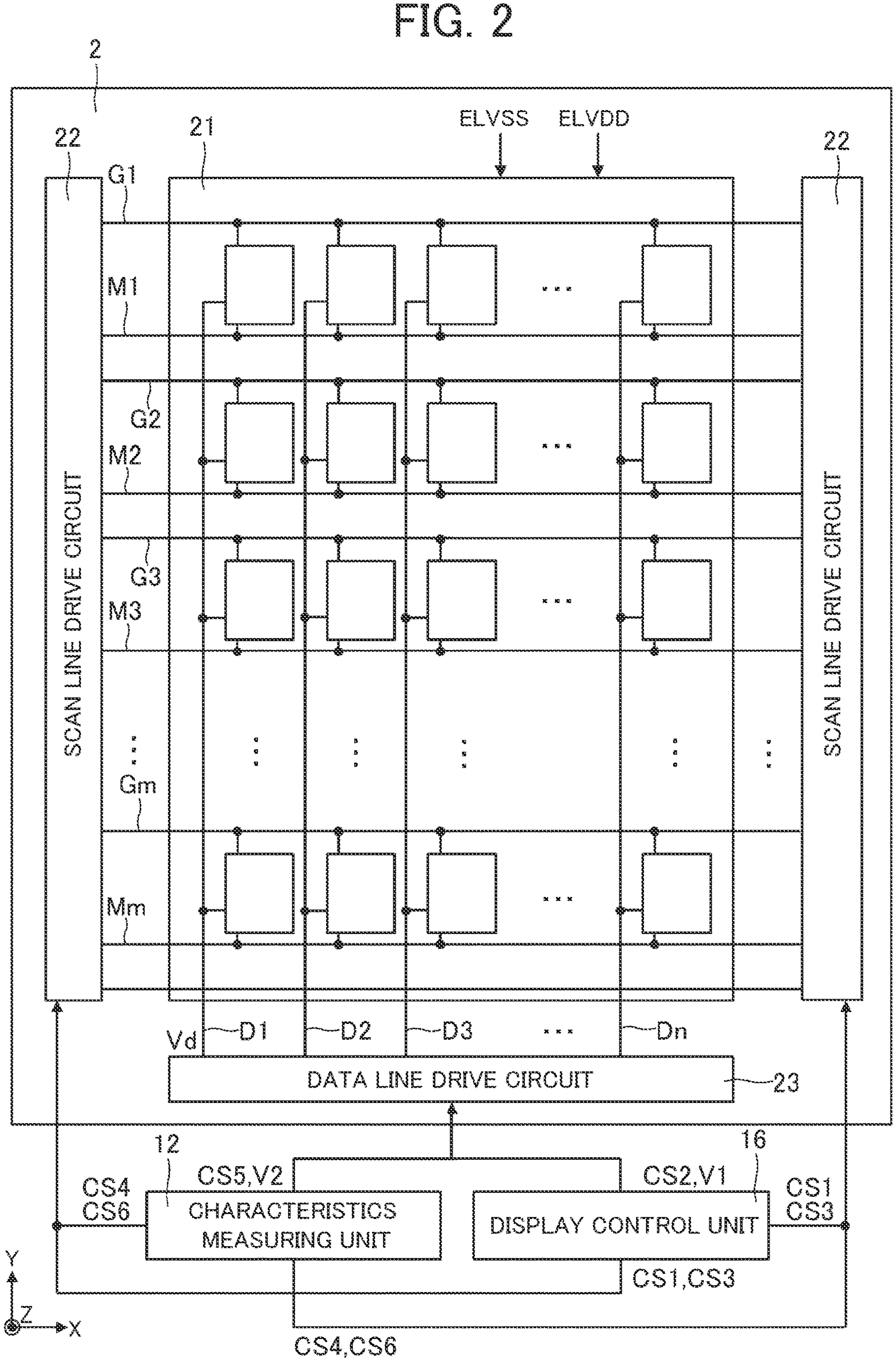
FIG. 2 is a diagram of an exemplary display panel in accordance with the embodiment.

A description is given next of an example of the display panel 2 with reference to FIG. 2. FIG. 2 is a diagram of an example of the display panel 2 in accordance with the embodiment.

Throughout the following description, the lateral direction in FIG. 2 is referred to as the X-direction (row direction), and the vertical direction in FIG. 2 is referred to as the Y-direction (column direction). The X-direction is either one of a longer side direction and a shorter side direction in a plane of the display panel 2, and the Y-direction is the other one of the longer side direction and the shorter side direction. The X-direction is perpendicular to the Y-direction. In addition, both the X-direction and the Y-direction are perpendicular to the thickness direction (Z-direction) of the display panel 2. In addition, throughout the following description, "m" and "n" are an integer greater than or equal to 2, "i" is an integer greater than or equal to 1 and less than or equal to m, and "j" is an integer greater than or equal to 1 and less than or equal to n. Additionally, the ON level is a voltage level that turns on a transistor when applied to the gate terminal thereof, and the OFF level is a voltage level that turns off a transistor when applied to the gate terminal thereof. For example, when the transistor is of an n-channel type, the ON level is a HIGH level, and the OFF level is a LOW level.

Referring to FIG. 2, the display panel 2 includes a display unit 21, scan line drive circuits 22, and a data line drive circuit 23. The scan line drive circuits 22 and the data line drive circuit 23 are connected to the display control unit 16 and the characteristics measuring unit 12. In addition, each pixel circuit 3 is fed with a high-level power supply voltage ELVDD and a low-level power supply voltage ELVSS by using an electrically conductive member (not shown; wiring lines and electrodes).

The display unit 21 includes m scan lines G1 to Gm, m measurement control lines M1 to Mm, and n data lines D1 to Dn. In addition, m×n pixel circuits 3 are arranged in a plane (on a face) of the display unit 21. The scan lines G1 to Gm and the measurement control lines M1 to Mm extend parallel to each other in the X-direction (row direction). The data lines D1 to Dn extend parallel to each other in the Y-direction (column direction). The scan lines G1 to Gm and the measurement control lines M1 to Mm are perpendicular to the data lines D1 to Dn. The scan lines G1 to Gm and the data lines D1 to Dn intersect with each other at m×n points. One of the pixel circuits 3 that is positioned in row i, column j is connected to the scan line Gi, the measurement control line Mi, and the data line Dj.

The data line drive circuit 23 applies the data voltage Vd to the data lines D1 to Dn. The data line drive circuit 23 includes a DAC (digital analog converter) to change the magnitude of the data voltage Vd. The display control unit 16 and the characteristics measuring unit 12 control the operation of the scan line drive circuits 22 and the data line drive circuit 23.

To produce an ordinary video display, the display control unit 16 outputs control signals CS1, CS3 to the scan line drive circuits 22. On the basis of the control signal CS1, the scan line drive circuits 22 control the levels of the scan lines G1 to Gm. Specifically, on the basis of the control signal CS1, the scan line drive circuits 22 change the level to the ON level on a scan line G that is one of the scan lines G1 to Gm. Hence, the n pixel circuits 3 that are connected to the selected scan line G are collectively selected. The scan line drive circuits 22 sequentially selects the scan line G. In addition, the scan line drive circuits 22 control the levels on the measurement control lines M1 to Mm on the basis of the control signal CS3.

Furthermore, the display control unit 16 outputs a control signal CS2 and the correction voltage value V1 (detailed later) to the data line drive circuit 23. The data line drive circuit 23 applies the data voltage Vd that has a magnitude equal to the instructed correction voltage value V1 to the data line D instructed by the control signal CS2. For example, the display control unit 16 outputs the correction voltage value V1 that is to be applied to the data lines D. The data line drive circuit 23 applies n types of data voltage Vd to the data lines D1 to Dn. Hence, the data voltage Vd (voltage that has a magnitude equal to the correction voltage value V1) is written to the n pixel circuits 3 that are selected by the scan line G. The light-emitting element L1 emits light with a luminance that is in accordance with the magnitude of the data voltage Vd.

To measure (monitor) a measurement value, the characteristics measuring unit 12 outputs measurement-use control signals CS4, CS6 to the scan line drive circuits 22. On the basis of the measurement-use control signal CS4, the scan line drive circuits 22 change the level to the ON level on the scan line G which is one of the scan lines G1 to Gm that is connected to the pixel circuit 3 on which measurement is to be performed for a measurement value. Specifically, on the basis of the measurement-use control signal CS4, the scan line drive circuits 22 selects a scan line G from one of the scan lines G1 to Gm. Hence, the n pixel circuits 3 that are connected to the selected scan line G are collectively selected. In addition, the scan line drive circuits 22 control the level on a measurement control line M connected to the pixel circuit 3 on which measurement is to be performed for a measurement value on the basis of the measurement-use control signal CS6.

In addition, the characteristics measuring unit 12 outputs a measurement-use control signal CS5 and a measurement-use voltage value V2 to the data line drive circuit 23. The data line drive circuit 23 applies the data voltage Vd that has a magnitude equal to the instructed measurement-use voltage value V2 to the data line D instructed by the measurement-use control signal CS5 (the data line D connected to the pixel circuit 3 on which measurement is to be performed). Hence, the data voltage Vd that has a magnitude equal to the measurement-use voltage value V2 is written to the selected pixel circuit 3. The light-emitting element L1 emits light with a luminance that is in accordance with the magnitude of the measurement-use voltage value V2.

Pixel Circuit 3

Figure 3:
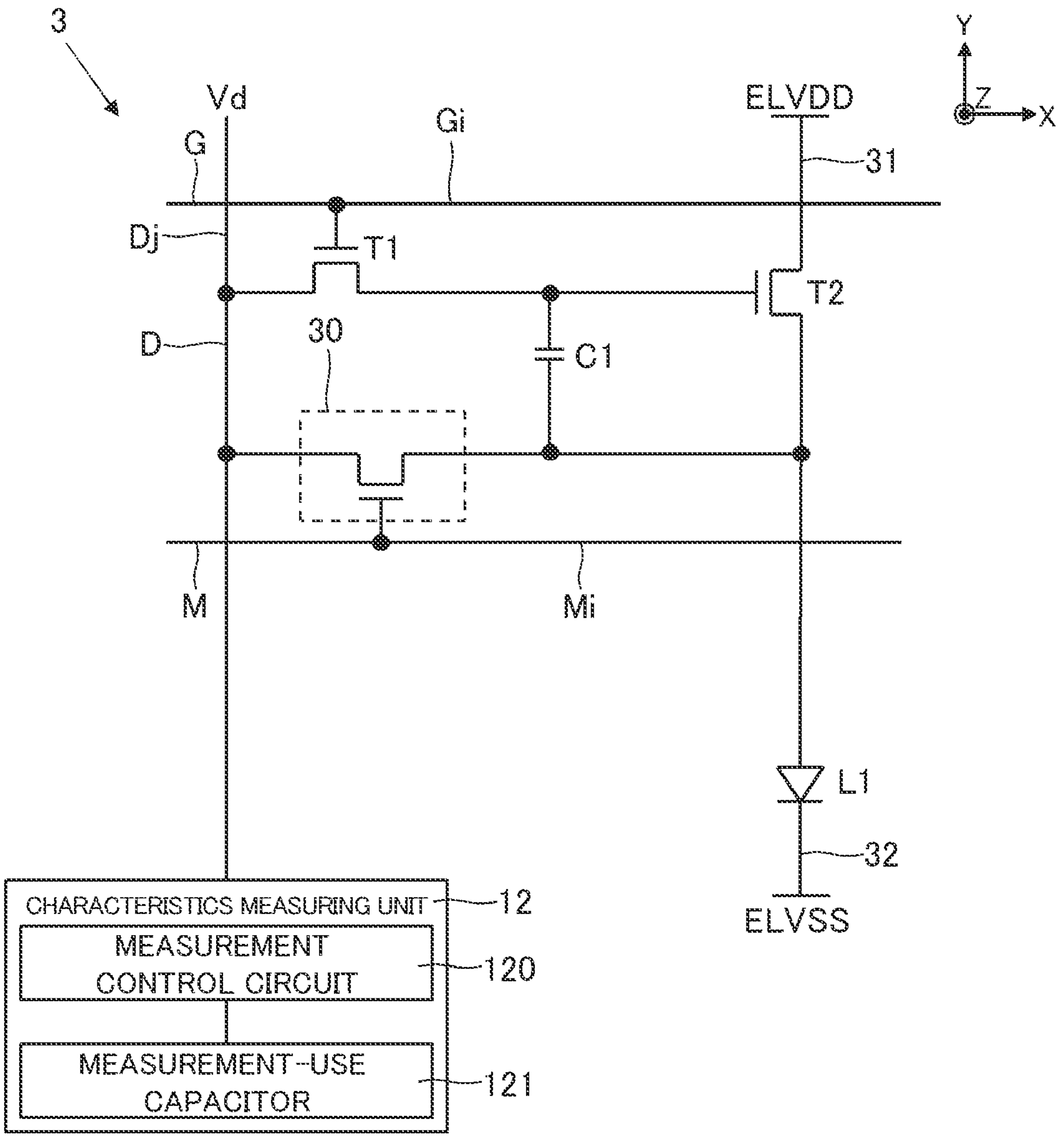
FIG. 3 is a diagram of an exemplary pixel circuit in accordance with the embodiment.

A description is given next of an example of the pixel circuits 3 with reference to FIG. 3. FIG. 3 is a diagram of an example of the pixel circuits 3 in accordance with the embodiment.

One of the pixel circuits 3 that is located in row i, column j is taken as an example. All the pixel circuits 3 have the same structure. The same description applies to the other pixel circuits 3. Each pixel circuit 3 includes at least a write control transistor T1, a drive transistor T2, a measurement-use switch 30, a light-emitting element L1, and a capacitor C1 (capacitive element). Each transistor is, for example, an n-channel type of thin film transistor.

The measurement-use switch 30 may be a thin film transistor (TFT). The following will describe an example where a thin film transistor is used as the measurement-use switch 30. The thin film transistor that is the measurement-use switch 30 is capable of passing electric current in both directions. Note that the measurement-use switch 30 may be a switching element other than a thin film transistor.

The pixel circuit 3 is connected to a first power supply line 31 and a second power supply line 32. The first power supply line 31 and the second power supply line 32 are connected to a power supply circuit (not shown). The first power supply line 31 is fed with the high-level power supply voltage ELVDD. The second power supply line 32 is fed with the low-level power supply voltage ELVSS. In addition, the pixel circuit 3 in row i, column j is connected to the scan line Gi, the measurement control line Mi, and the data line Dj. In an ordinary video display, the display control unit 16 causes the data voltage Vd corresponding to the correction voltage value V1 to be applied to the data line Dj. The data line D is a line for applying a voltage to the gate of the drive transistor T2.

The write control transistor T1 is connected at the gate thereof to the scan line Gi. The write control transistor T1 is connected at the drain thereof to the data line Dj in column j. The write control transistor T1 is connected at the source thereof to one of the two terminals of the capacitor C1 and the gate of the drive transistor T2. The write control transistor T1, when turned on, connects the data line D to the gate of the drive transistor T2. The scan line G is connected to the gate of the write control transistor T1 to control turning on/off of the write control transistor T1.

The drive transistor T2 is connected at the drain thereof to the first power supply line 31. The drive transistor T2 is connected at the source thereof to the other terminal of the capacitor C1, the measurement-use switch 30, and the anode of the light-emitting element L1. Note that the light-emitting element L1 is connected at the cathode thereof to the second power supply line 32 (low-level power supply voltage ELVSS).

The measurement-use switch 30 is connected at the gate (control terminal) thereof to the measurement control line M. In addition, the measurement-use switch 30 is connected at one of the terminals thereof (one of the non-gate terminals) to the data line D. The measurement-use switch 30 is connected at the other terminal thereof (the other one of the non-gate terminals) thereof to the source of the drive transistor T2 and the anode of the light-emitting element L1. The measurement-use switch 30 is turned on/off on the basis of the level on the measurement control line M. In measuring the electrical characteristics of an element in the pixel circuit 3, the characteristics measuring unit 12 controls the measurement-use switch 30. The characteristics measuring unit 12 controls the measurement-use switch 30 so as to pass an electric current through the element the characteristics of which are to be measured.

A description is given of an operation in an ordinary video display. The display control unit 16 causes the scan line drive circuits 22 to switch the scan lines G that go ON every horizontal scan period. The scan lines G sequentially and exclusively go ON. Then, for example, when the scan line Gi is ON, the data line drive circuit 23 applies, to the data line Dj in column j, the data voltage Vd that has an electrical potential in accordance with the correction voltage value V1 of the pixel circuit 3 in row i, column j.

When the scan line G in line i is ON, the write control transistor T1 in the pixel circuit 3 in line i is ON. Hence, the gate potential of the drive transistor T2 approaches the data voltage Vd. The drive transistor T2 is turned ON in due course of time. The drive transistor T2 passes, through the light-emitting element L1, an electric current that has a magnitude in accordance with the gate potential (gate-source voltage).

When the select period for the scan line Gi is over, the scan line drive circuit 22 causes the scan line Gi to go OFF, which turns off the write control transistor T1. Even when the write control transistor T1 in line i is turned off, the capacitor C1 maintains the gate-source voltage of the drive transistor T2. Therefore, the drive transistor T2 continues to pass, through the light-emitting element L1, an electric current that is in accordance with the voltage maintained by the capacitor C1 until the scan line Gi goes ON again. The light-emitting element L1 continues to emit light with a luminance that is in accordance with the electrical potential (correction voltage value V1) of the data voltage Vd (j) produced when the write control transistor T1 is ON.

Owing to the switching of the scan lines G and the data lines D, the light-emitting element L1 in each pixel circuit 3 emits light with a luminance that is in accordance with the voltage value (correction voltage value V1) that is based on the gray level of the video signal. The switching of the luminance is repeated every frame. When a moving image is being displayed, the electrical potential on each data line Dj constantly changes in accordance with the display content.

Note that as shown in FIG. 3, the characteristics measuring unit 12 may be connected to the data line D to measure the characteristics of an element.

Temporal Changes

Figure 4:
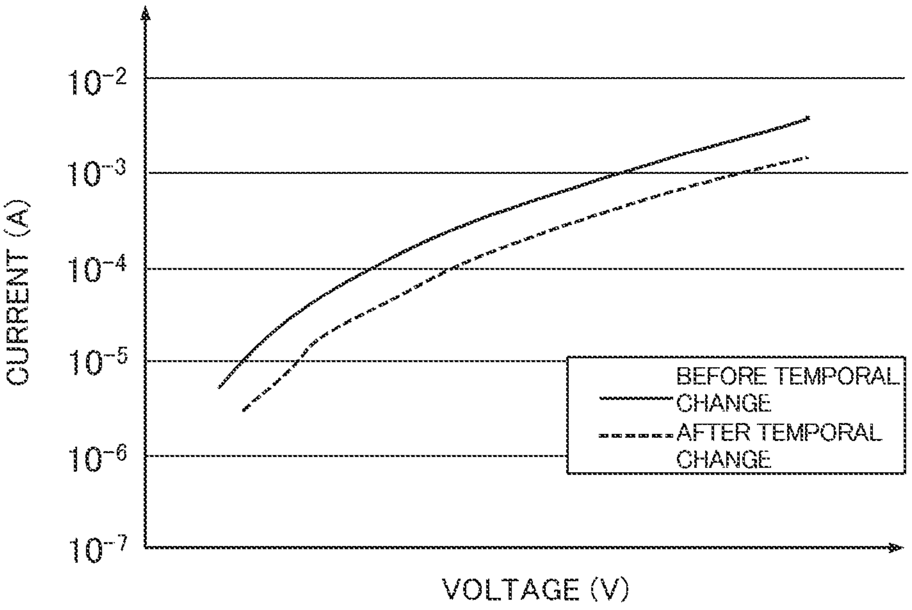
FIG. 4 is a diagram of exemplary temporal changes of the voltage-current characteristics of a light-emitting element in accordance with the embodiment.
Figure 5:
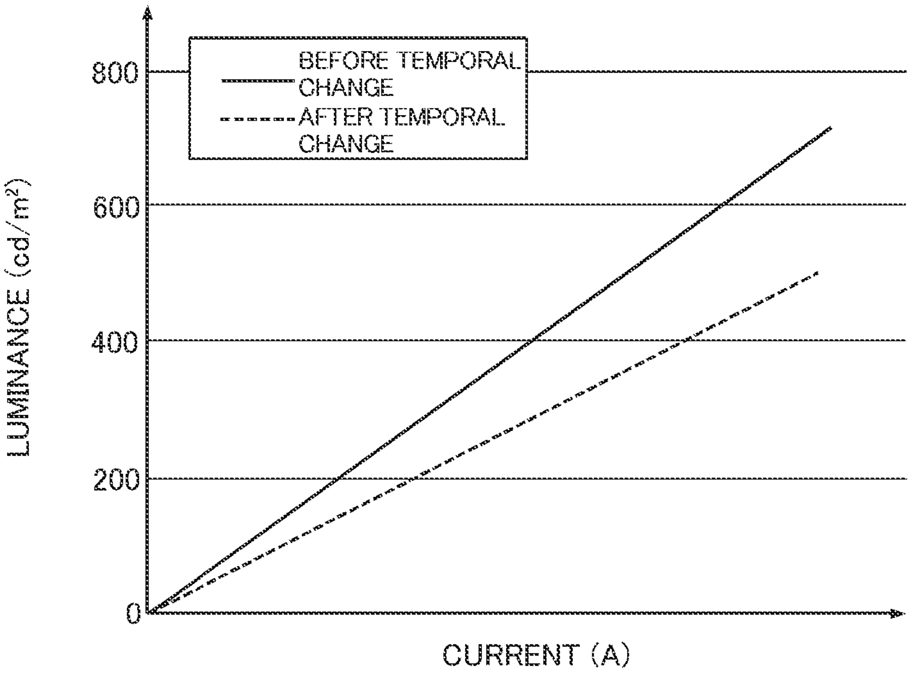
FIG. 5 is a diagram of exemplary temporal changes of the current-luminance characteristics of the light-emitting element in accordance with the embodiment.

A description is given next of an example of temporal changes of the light-emitting element L1 with reference to FIGS. 4 and 5. FIG. 4 is a diagram of an example of the temporal changes of the voltage-current characteristics of the light-emitting element L1 in accordance with the embodiment. FIG. 5 is a diagram of an example of the temporal changes of the current-luminance characteristics of the light-emitting element L1 in accordance with the embodiment.

It is known that OLEDs change the electrical characteristics thereof over the course of the use thereof. The light-emitting element L1 changes the characteristics thereof over the course of the use thereof. The light-emitting element L1 changes, for example, the voltage-current characteristics and current-luminance characteristics thereof. In FIG. 4, the solid line represents an example of the voltage-current characteristics of the light-emitting element L1 before temporal changes occur (immediately after the light-emitting element L1 starts being used). In FIG. 4, the broken line represents an example of the voltage-current characteristics of the light-emitting element L1 after temporal changes have occurred. FIG. 4 shows an example of the electric current through the light-emitting element L1 decreasing with an increase in usage time (light-emission time), with the applied voltage being maintained constant. A decrease in the electric current leads to a decrease in the luminance of the light-emitting element L1.

In FIG. 5, the solid line represents an example of the current-luminance characteristics of the light-emitting element L1 before temporal changes occur. In FIG. 5, the broken line represents an example of the current-luminance characteristics of the light-emitting element L1 after temporal changes have occurred. FIG. 5 shows an example of the luminance of the light-emitting element L1 decreasing with an increase in usage time, with the magnitude of the electric current being maintained constant. FIG. 5 demonstrates that the electric current should be increased to restore luminance in response to temporal changes.

Note that transistors (not shown) can change the voltage-current characteristics thereof over the course of the use thereof. For example, the drive transistor T2 tends to pass smaller electric current as usage time increases. As a result, the electric current through the drive transistor T2 can decrease with usage time even under the same data voltage Vd. A decrease in the electric current leads to a decrease in the luminance of the light-emitting element L1.

The luminance needs to be adjusted in accordance with a change in the electrical characteristics caused by temporal changes. In the display device 1, the magnitude of the data voltage Vd is corrected to adjust the luminance. In this description, the corrected voltage value is referred to as the correction voltage value V1. The correction of the magnitude of the data voltage Vd in response to temporal changes may be referred to as compensation or decay compensation.

Temperature Characteristics

Figure 6:
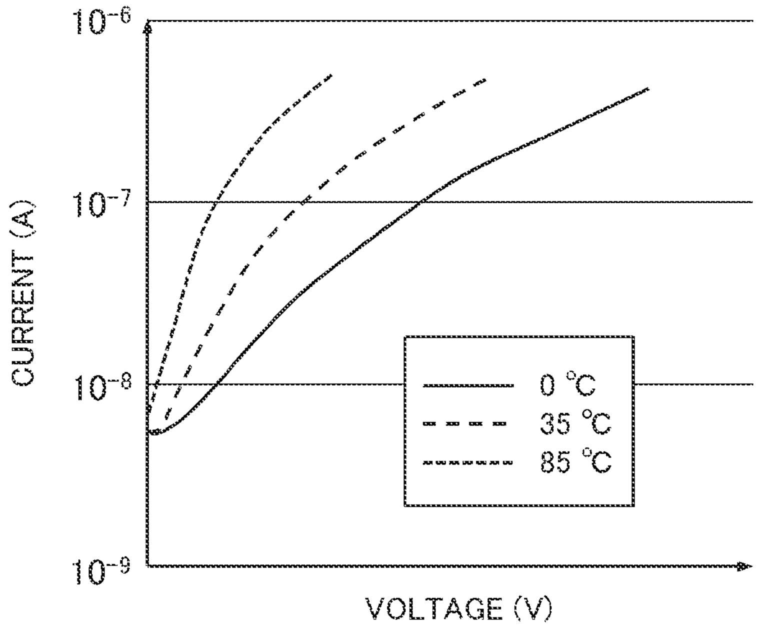
FIG. 6 is a diagram of exemplary temperature characteristics of the light-emitting element in accordance with the embodiment.
Figure 7:
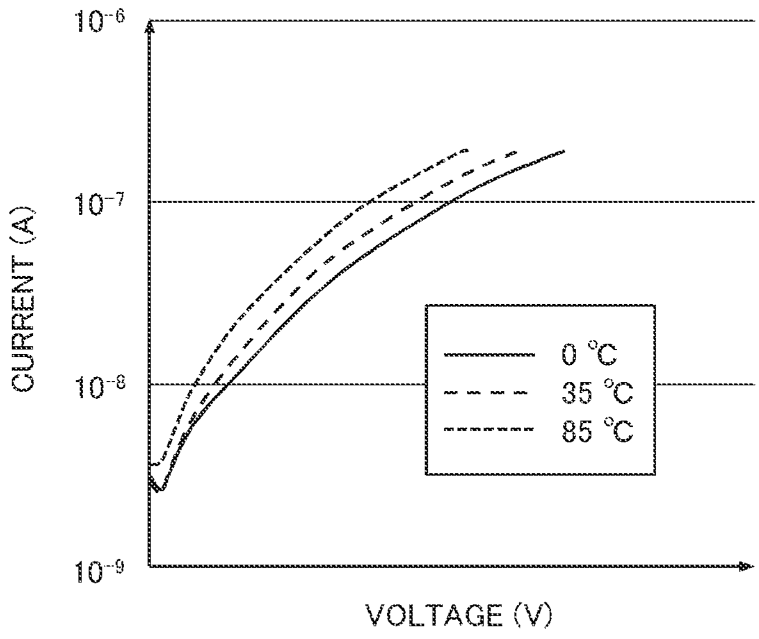
FIG. 7 is a diagram of exemplary temperature characteristics of a drive transistor in accordance with the embodiment.

A description is given next of an example the temperature characteristics of the light-emitting element L1 and the transistor with reference to FIGS. 6 and 7. FIG. 6 is a diagram of an example of the temperature characteristics of the light-emitting element L1 in accordance with the embodiment. FIG. 7 is a diagram of an example of the temperature characteristics of the drive transistor T2 in accordance with the embodiment.

As demonstrated in FIG. 6, the light-emitting element L1 (OLED) passes more electric current at a higher temperature. As demonstrated in FIG. 7, the drive transistor T2 (TFT) also passes more electric current at a higher temperature. To determine the correction value 140 in response to temporal changes, the temperature at the time of characteristics measurement needs to be taken into account.

For instance, suppose that an algorithm for increasing the data voltage Vd is used in measurement until the electric current reaches a target value. If the temperature at the time of measurement is too low, the magnitude of the electric current can in some cases not reach the target value even if the data voltage Vd is set to a maximum value. In this case, the algorithm cannot be completed. As a result, the correction value 140 cannot be determined. No correction can be performed in response to temporal changes.

Computing Correction Value 140

Figure 8:
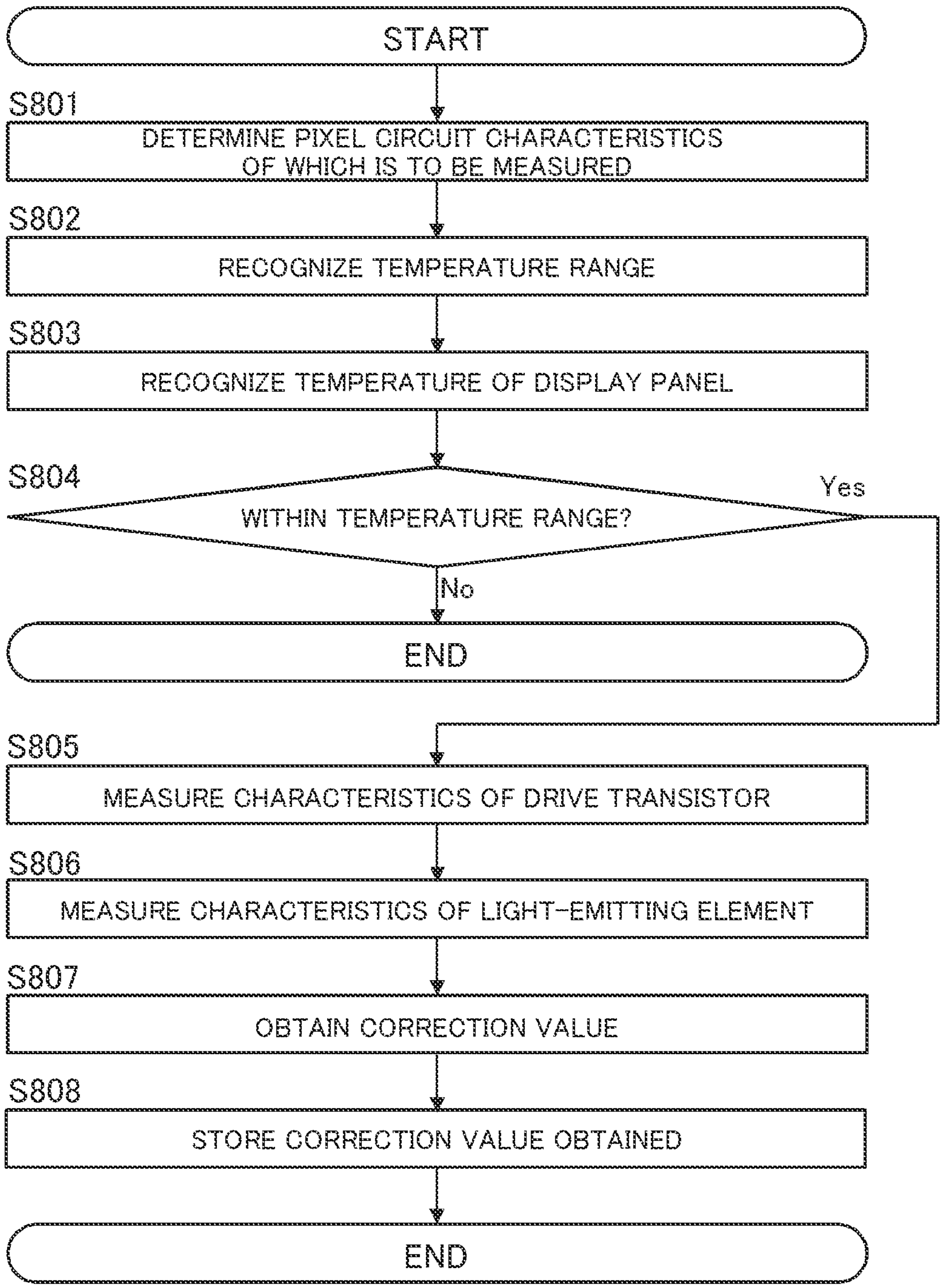
FIG. 8 is a diagram of an exemplary correction value computation process in accordance with the embodiment.
Figure 9:
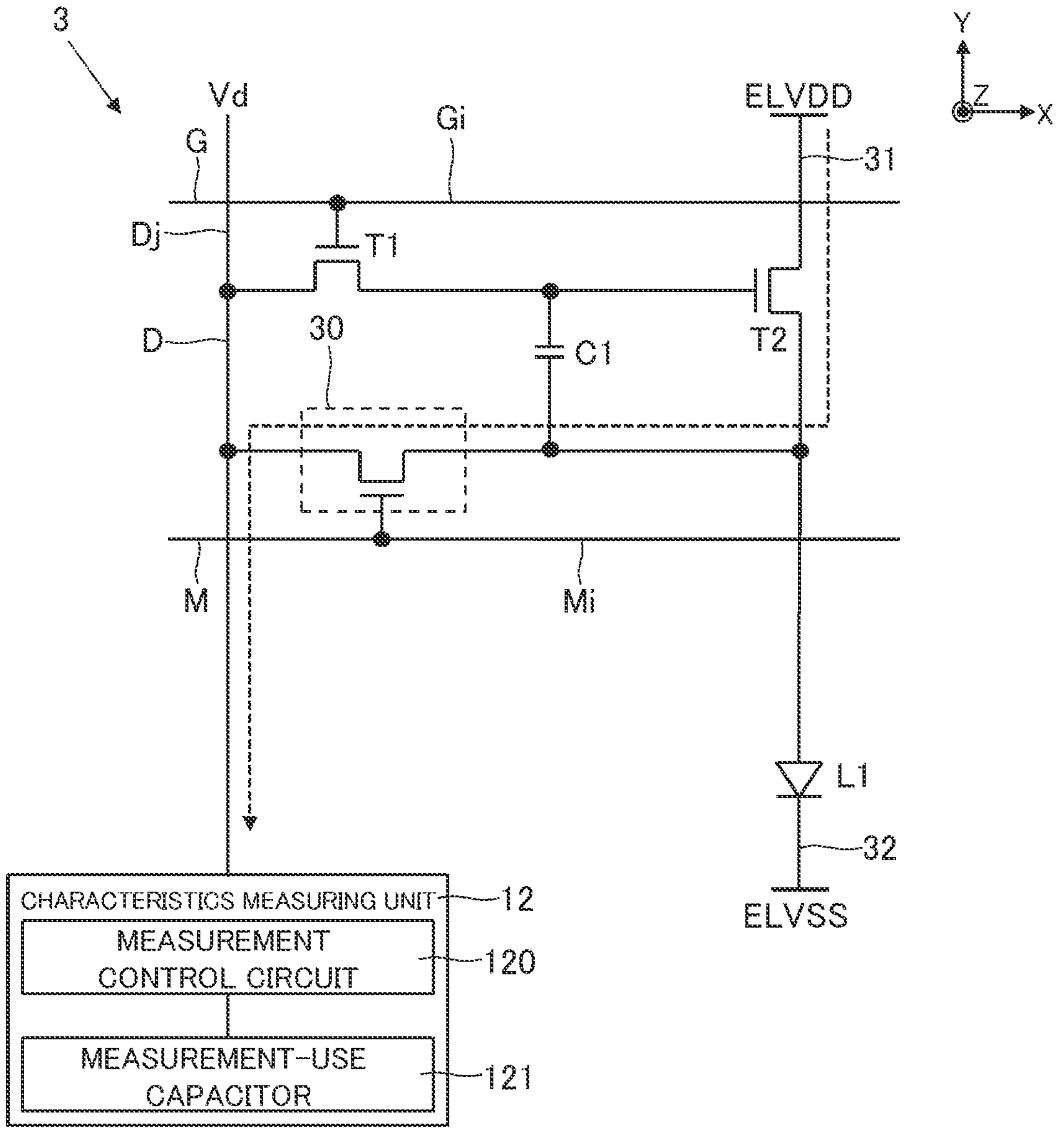
FIG. 9 is a diagram of an exemplary electric current flow when the characteristics of the drive transistor are measured in accordance with the embodiment.
Figure 10:
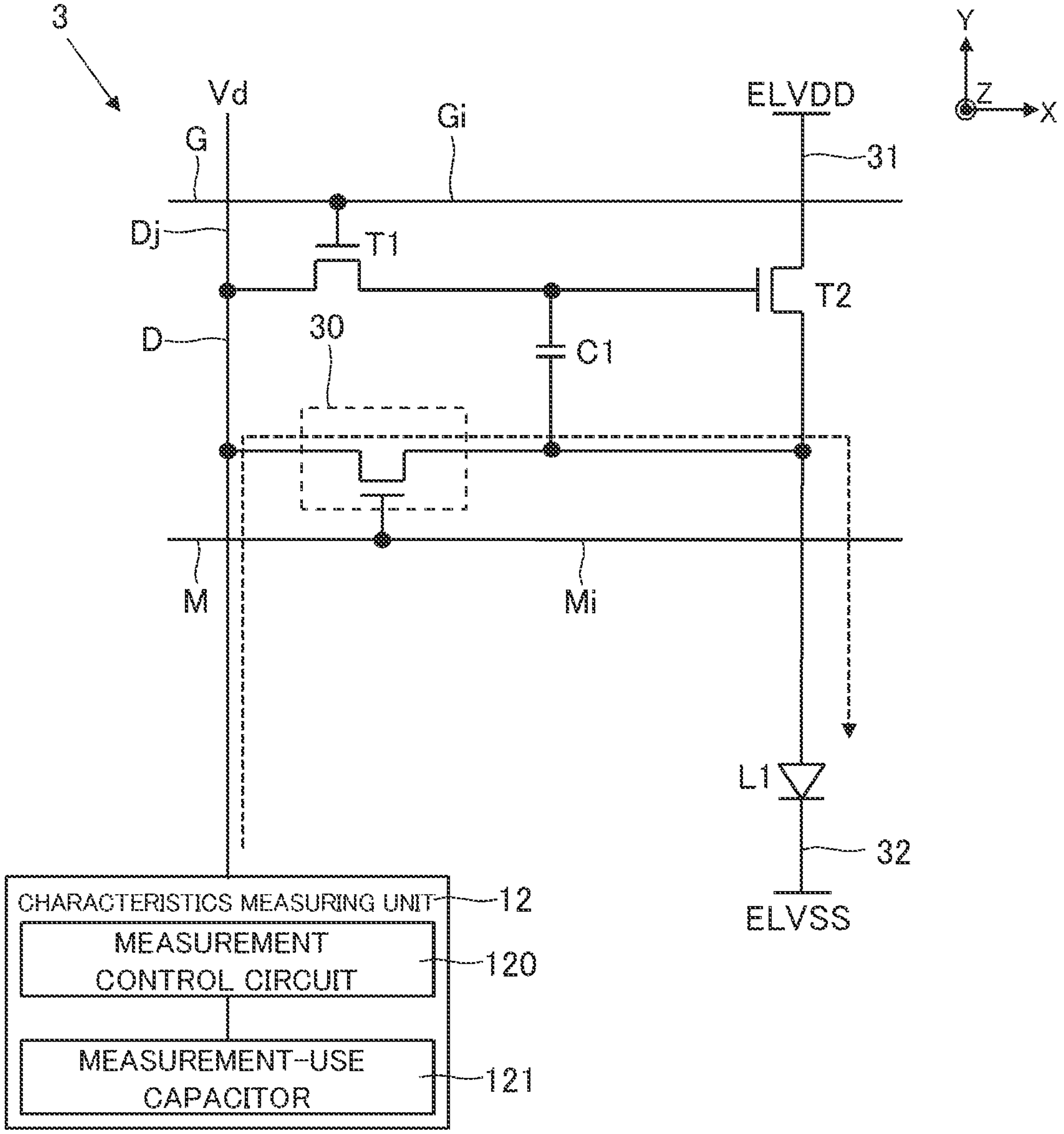
FIG. 10 is a diagram of an exemplary electric current flow when the characteristics of the light-emitting element are measured in accordance with the embodiment.

A description is given next of an example of the computation of the correction value 140 with reference to FIGS. 8 to 10. FIG. 8 is a diagram of an example of the computation of the correction value 140 in accordance with the embodiment. FIG. 9 is a diagram of an exemplary electric current flow when the characteristics of the drive transistor T2 are measured in accordance with the embodiment. FIG. 10 is a diagram of an exemplary electric current flow when the characteristics of the light-emitting element L1 are measured in accordance with the embodiment.

The luminance of the light-emitting element L1 decreases as temporal changes progress even if the magnitude of the voltage applied to the gate of the drive transistor T2 (data voltage Vd) remains the same and the temperature also remains the same. For example, the displayed video can gradually become darker over the course of the use of the light-emitting element L1. To recognize the progress of temporal changes and determine the correction value 140, the characteristics measuring unit 12 measures the electrical characteristics of an element for each pixel circuit 3. The correction value computation unit 13 obtains, as the correction value 140, a parameter for correcting (compensating) luminance for each pixel circuit 3 in accordance with results of the measurement. The correction processing unit 15 performs correction on the basis of the correction value 140. For example, in measurement, the characteristics measuring unit 12 causes a voltage with a prescribed magnitude to be applied to the pixel circuit 3 (data line D). The characteristics measuring unit 12 then measures either or both of the magnitude of the electric current passing through the light-emitting element L1 and the magnitude of the electric current passing through the drive transistor T2. The correction value computation unit 13 obtains the correction value 140 on the basis of results of the measurement.

Here, when the data voltage Vd (measuring voltage) with a prescribed magnitude is to be applied in measurement, the electric current can be too small if the temperature is too low at the time of the measurement. Small electric current is easily affected by noise. It is more likely at lower temperatures that the luminance cannot be properly corrected by using the obtained correction value 140. Depending on the temperature at the time of measurement, the luminance may not be properly corrected even if the correction value 140 is determined on the basis of measurement values.

Accordingly, in the display device 1, the temperature range is narrowed down in which the characteristics measuring unit 12 measures the electrical characteristics of an element in the pixel circuit 3. The characteristics measuring unit 12 measures only in a temperature environment where electric current can readily flow. The correction value 140 can be properly determined even if temporal changes have progressed.

A description is given in the following of an exemplary computation of the correction value 140 with reference to FIG. 8. In FIG. 8, "START" is a time when the measurement of the characteristics and the computation of the correction value 140 are started. The characteristics measuring unit 12 starts the measurement at a timing that does not affect the display.

Here, the display device 1 may include an operation unit. The operation unit is either or both of an operation panel (not shown) and a remote controller (not shown). The characteristics measuring unit 12 and the correction value computation unit 13 may start the flow chart shown in FIG. 8 when a display is started in response to the operation unit receiving a switch-on of the power supply for the display device 1. In addition, the characteristics measuring unit 12 and the correction value computation unit 13 may start the flow chart shown in FIG. 8 when a display is terminated in response to the operation unit receiving a switch-off of the power supply for the display device 1.

In addition, the characteristics measuring unit 12 and the correction value computation unit 13 may start the flow chart shown in FIG. 8 when the screen turns black. For example, the screen can turn black when the screen changes on the basis of an instruction to the operation unit.

In addition, the process shown in FIG. 8 may be selectable as a type of image quality adjustment menu. For example, the image quality adjustment menu may include entries like "Automatic Luminance Adjustment" and "Compensation." The characteristics measuring unit 12 and the correction value computation unit 13 may start the flow chart shown in FIG. 8 when the operation unit has received a selection of the entry corresponding to the process shown in FIG. 8.

The measurement is done for each pixel circuit 3. Performing measurement on all the pixel circuits 3 takes some time. Accordingly, in step S801, the characteristics measuring unit 12 determines the pixel circuit 3 the characteristics of which are to be measured.

Here, the pixel circuits 3 may be divided into a plurality of groups (blocks). For example, the pixel circuits 3 arranged on the display panel 2 may be divided into strip-like groups that extend parallel to the X-direction. Here, those pixel circuits 3 for a few scan lines G to a few dozens of scan lines G that are adjacent to each other in the Y-direction may make one group. For example, when there are a total of 2,160 scan lines G, and each group includes four scan lines G, the total number of groups is equal to 540.

In each measurement, the characteristics measuring unit 12 may measure the characteristics of only a single group of pixel circuits 3 so that the correction value computation unit 13 can determine the correction value 140. For example, the groups have a predetermined order. The characteristics measuring unit 12 may sequentially measure the characteristics of the groups of pixel circuits 3.

Note that when an instruction for a characteristics measurement and a correction value computation is issued as one of image quality adjustment menus, the characteristics measuring unit 12 may measure the characteristics of all the pixel circuits 3 (all the groups of pixel circuits 3) in a single measurement so as to determine the correction value 140.

Next, in step S802, the characteristics measuring unit 12 recognizes a temperature range. The temperature range may be predetermined and fixed. For example, the temperature range may not cover temperatures less than or equal to a reference temperature. For example, the reference temperature may be an equivalent of room temperature. For example, the reference temperature may be any temperature in the range of from 20 degrees Celsius to 30 degrees Celsius (e.g., 25 degrees Celsius). In addition, the temperature range may cover a range beyond 30 degrees Celsius. In addition, like indoor installation use and in-vehicle use, the temperature range may vary with the usage of the display device 1.

Then, in step S803, the characteristics measuring unit 12 recognizes (senses) the temperature of the display panel 2 on the basis of the output of the temperature sensor 11. In step S804, the characteristics measuring unit 12 checks whether or not the recognized temperature is within the temperature range. If the recognized temperature is out of the temperature range, the characteristics measuring unit 12 terminates the process (END). On the other hand, if the recognized temperature is within the temperature range, the characteristics measuring unit 12, in step S805, measures the electrical characteristics of the drive transistor T2 in each pixel circuit 3.

In other words, the characteristics measuring unit 12 obtains a measurement value when the temperature of the display panel 2 is within the predetermined temperature range and does not obtain a measurement value when the temperature of the display panel 2 is out of the temperature range. Hence, it is possible to avoid measurement in an environment where electric current does not readily pass through the element. It is possible measure the characteristics of the element in the pixel circuit 3 only in an environment where the obtained correction value 140 allows for improvement of image quality. Since the obtained correction value 140 is appropriate, the resultant display device 1 is capable of retaining high image quality.

In step S805, for example, the characteristics measuring unit 12 measures the voltage-current characteristics of the drive transistor T2 for one pixel circuit 3 at a time. In the following description, the measurement value obtained by the measurement in step S805 will be referred to as a first measurement value. Referring to FIG. 9, a description is given of an exemplary measurement of the characteristics of the drive transistor T2.

First, the characteristics measuring unit 12 instructs the data line drive circuit 23 to apply a measuring voltage to the data line D of the pixel circuit 3 on which measurement is to be performed. The magnitude of the measurement-use voltage value V2 is predetermined. Subsequently, the characteristics measuring unit 12 instructs the scan line drive circuits 22 to cause the scan line G of the pixel circuit 3 on which measurement is to be performed to go On. Hence, the write control transistor T1 in the pixel circuit 3 on which measurement is to be performed is turned on. As a result, the measuring voltage is applied to the capacitor C1. Electric charge builds up in the capacitor C1. Voltage rises between the terminals of the capacitor C1. After the write control transistor T1 has been turned on for a prescribed time, the characteristics measuring unit 12 instructs the data line drive circuit 23 to stop the application of the measuring voltage to the data line D in the pixel circuit 3 on which measurement is to be performed. In other words, the characteristics measuring unit 12 instructs the data line drive circuit 23 to reduce the voltage to be applied to the data line D. For example, the characteristics measuring unit 12 is dropped to the ground level. In addition, the characteristics measuring unit 12 instructs the scan line drive circuits 22 to maintain the measurement-use switch 30 in the pixel circuit 3 on which measurement is to be performed in a non-conduction state until the application of the measuring voltage to the data line D in the pixel circuit 3 on which measurement is to be performed is stopped.

Meanwhile, the drive transistor T2 is turned on. An electric current starts flowing in accordance with the electric charge collected in the capacitor C1. As the application of the measuring voltage to the data line D in the pixel circuit 3 on which measurement is to be performed is stopped, the characteristics measuring unit 12 instructs the scan line drive circuits 22 to close the measurement-use switch 30 in the pixel circuit 3 on which measurement is to be performed. As a result, an electric current flows via the first power supply line 31 (high-level power supply voltage ELVDD), the drive transistor T2, the measurement-use switch 30, and the data line D toward the characteristics measuring unit 12. Since the electrical potential on the data line D is lowered, an electric current flows toward the characteristics measuring unit 12. In other words, the characteristics measuring unit 12 lowers the electrical potential on the data line D so that no electric current can flow through the light-emitting element L1. As a result, the characteristics measuring unit 12 does not cause the light-emitting element L1 to emit light when the characteristics of the drive transistor T2 are measured.

The characteristics measuring unit 12 is connected to the data line D for measurement. In FIG. 9, the arrow-headed broken line represents an electric current flow at the time of measurement of the first measurement value. The characteristics measuring unit 12 recognizes the magnitude of the electric current flow through the drive transistor T2. For example, the characteristics measuring unit 12 includes a measurement control circuit 120 and a measurement-use capacitor 121. The characteristics measuring unit 12 turns on the measurement-use switch 30 for a predetermined time. The measurement-use capacitor 121 stores the electric charge of the electric current that has been passed for this predetermined time. The terminal-to-terminal voltage of the measurement-use capacitor 121 varies with the quantity of the stored electric charge. The measurement control circuit 120 may recognize the terminal-to-terminal voltage of the measurement-use capacitor 121 to determine the amount of current per unit time as the first measurement value.

In this manner, in determining the first measurement value, the characteristics measuring unit 12 controls the measurement-use switch 30 so as to pass an electric current through the drive transistor T2, but not to pass an electric current through the light-emitting element L1, thereby determining a measurement value (first measurement value) based on the electric current that has been passed through the drive transistor T2. Hence, it is possible to measure the characteristics of the drive transistor T2 without having to pass an electric current through the light-emitting element L1. It is possible to accurately know the voltage-current characteristics of the drive transistor T2 after temporal changes have occurred.

Specifically, when an electric current is passed through the drive transistor T2, but not through the light-emitting element L1, the characteristics measuring unit 12 turns on the drive transistor T2 and the measurement-use switch 30 and determines the first measurement value on the basis of the electric current that flows in the data line D via the drive transistor T2 and the measurement-use switch 30. Hence, it is possible to measure the characteristics of the electric current of the drive transistor T2 without having to pass an electric current through the light-emitting element L1.

Furthermore, in step S806, the characteristics measuring unit 12 measures the electrical characteristics of the light-emitting element L1 for each of the pixel circuits 3. In step S806, for example, the characteristics measuring unit 12 measures the voltage-current characteristics of the light-emitting element L1. Throughout the following, the measurement value obtained in step S806 will be referred to as a second measurement value. A description is now given of an example of the measurement of characteristics of the light-emitting element L1 with reference to FIG. 10.

First, the characteristics measuring unit 12 instructs the data line drive circuit 23 to apply a measuring voltage to the data line D of the pixel circuit 3 on which measurement is to be performed. Meanwhile, the characteristics measuring unit 12 instructs the scan line drive circuits 22 to maintain the scan line G of the pixel circuit 3 on which measurement is to be performed at the OFF level. Hence, the write control transistor T1 and the drive transistor T2 remain turned OFF. The drive transistor T2 does not pass an electric current. In addition, the characteristics measuring unit 12 instructs the scan line drive circuits 22 to turn on the measurement-use switch 30. Note that the measurement-use switch 30 is a bidirectional switch.

As a result, an electric current flows to the light-emitting element L1 via the characteristics measuring unit 12 (data line D) and the measurement-use switch 30. In FIG. 10, the arrow-headed broken line indicates the flow of the electric current at the time of measurement of the second measurement value. The characteristics measuring unit 12 measures the magnitude of the electric current flowing in the light-emitting element L1 as the second measurement value.

As described here, when the second measurement value is to be obtained, the characteristics measuring unit 12 controls the measurement-use switch 30 so as not to pass an electric current through the drive transistor T2, but to pass an electric current through the light-emitting element L1, to obtain a measurement value (second measurement value) based on the electric current that has been passed through the light-emitting element L1. Hence, it is possible to measure the characteristics of the light-emitting element L1 without having to pass an electric current through the drive transistor T2. It is possible to accurately know the voltage-current characteristics of the light-emitting element L1 after temporal changes have occurred.

Specifically, when an electric current is passed through the light-emitting element L1, but not through the drive transistor T2, the characteristics measuring unit 12 turns off the write control transistor T1 and the drive transistor T2, turns on the measurement-use switch 30, and determines the second measurement value on the basis of the electric current that flows in the light-emitting element L1 via the data line D and the measurement-use switch 30. Hence, it is possible to measure the characteristics of the electric current in the light-emitting element L1 without having to pass an electric current through the drive transistor T2. It is possible to pass an electric current via a route that is completely different from the route used when the characteristics of the drive transistor T2 are measured.

In step S807, on the basis of a result of the measurement, the correction value computation unit 13 determines the correction value 140 for each of the pixel circuits 3. The correction value 140 may be a value to be added to the data voltage Vd in accordance with the gray level in the video signal. Alternatively, the correction value 140 may be a coefficient by which a data voltage value (magnitude of a data voltage) that is in accordance with the gray level is multiplied. The following will describe an example of generation of the correction value 140.

(1) Lookup Table 141

For instance, the correction value computation unit 13 may determine the correction value 140 on the basis of a predetermined lookup table 141. For example, the memory 14 contains the lookup table 141 in a non-volatile fashion (see FIG. 1). Throughout the following, the lookup table 141 in which the correction value 140 is defined for each different combination of the first measurement value (electric current value of the drive transistor T2) and the second measurement value (electric current value of the light-emitting element L1) will be referred to as a first lookup table.

The correction value 140 is a value for restoring luminance. For example, the correction value 140 for a combination of the electric current value of the drive transistor T2 and the electric current value of the light-emitting element L1 is determined on the basis of an experiment. To obtain the same luminance as the light-emitting element L1 that has experienced no temporal change, either the voltage value to be added to the data voltage value that is in accordance with the gray level or the coefficient by which this data voltage value is to be multiplied is determined as the correction value 140. The correction value 140 is defined such that the light-emitting element L1 exhibits the same luminance in response to the gray level of the same value before and after temporal changes.

Note that the lookup table 141 may be a table data that defines the correction value 140 only for the first measurement value. This table data will be referred to as a second lookup table. When the second lookup table is used, the characteristics measuring unit 12 may skip step S806.

For instance, in the second lookup table, the correction value 140 is determined for the magnitude of the first measurement value on the basis of an experiment. To obtain the same luminance as the light-emitting element L1 that has experienced no temporal change, either the voltage value to be added to the data voltage value that is in accordance with the gray level or the coefficient by which this data voltage value is to be multiplied is determined as the correction value 140. The correction value 140 is determined such that the light-emitting element L1 exhibits the same luminance in response to the same gray level before and after temporal changes. In an ordinary video display, both the drive transistor T2 and the light-emitting element L1 conduct. Temporal changes progress in a similar manner. Even if the correction value 140 is determined on the basis of the electric current value of the drive transistor T2, the corrected luminance basically does not significantly differ from target luminance.

Note that the lookup table 141 may be table data in which the correction value 140 is defined only for the second measurement value. This table data will be referred to as a third lookup table. When the third lookup table is used, the characteristics measuring unit 12 may skip step S805.

For instance, the correction value 140 is determined for the magnitude of the second measurement value on the basis of an experiment. To obtain the same luminance as the light-emitting element L1 that has experienced no temporal change, either the voltage value to be added to the data voltage value that is in accordance with the gray level or the coefficient by which this data voltage value is to be multiplied is determined as the correction value 140. The correction value 140 is determined such that the light-emitting element L1 exhibits the same luminance in response to the same gray level before and after temporal changes.

(2) Computation

The correction value computation unit 13 may determine the correction value 140 through prescribed computation.

For example, the memory 14 may contain a first initial value and a second initial value for each of the pixel circuits 3 in a non-volatile fashion. For example, the first initial value is the first measurement value obtained in the first measurement, and the second initial value is the second measurement value obtained in the first measurement. The correction value computation unit 13 may determine the correction value 140 using the first initial value and the second initial value.

For instance, the correction value computation unit 13 may obtain, as the correction value 140 to be added, a value obtained by subtracting the sum of the first measurement value and the second measurement value from the sum of the first initial value and the second initial value. Alternatively, the correction value computation unit 13 may obtain, as the coefficient for multiplication, a value obtained by dividing the sum of the first initial value and the second initial value by the sum of the first measurement value and the second measurement value. Alternatively, the correction value computation unit 13 may determine the correction value 140 by performing other computation. In any case, the correction value computation unit 13 increases the data voltage Vd that corresponds to the gray level to obtain, as the correction value 140, a value for restoring the luminance of the light-emitting element L1.

In step S807, the correction value computation unit 13 determines the correction value 140 for each of the pixel circuits 3. In step S808, the correction value computation unit 13 stores each generated correction value 140 in the memory 14 in a non-volatile fashion.

Correction of Magnitude of Data Voltage

Figure 11:
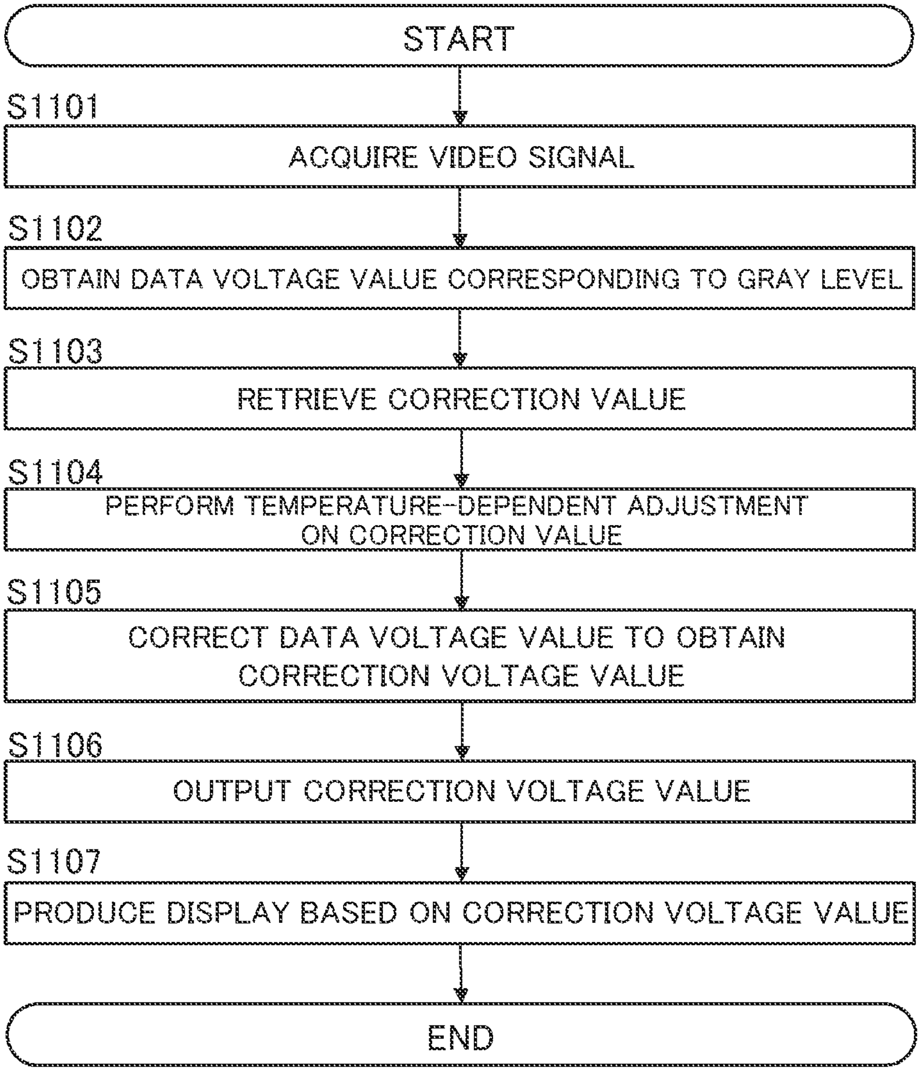
FIG. 11 is a diagram of an exemplary video signal correction process in accordance with the embodiment.

A description is given next of an example of correction of a video signal (magnitude of a data voltage) with reference to FIG. 11. FIG. 11 is a diagram of an exemplary video signal correction process in accordance with the embodiment.

The display device 1 includes the signal processing circuit 17 (see FIG. 1). The signal processing circuit 17 outputs a video signal for each of the pixel circuits 3. For example, the video signal includes a gray level representing the luminance of the light-emitting element L1. For example, when a bright image is to be displayed, the gray level has a value representing a high luminance. Then, on the basis of the correction value 140, the correction processing unit 15 corrects the magnitude of the data voltage Vd (voltage applied to the data line D) that is in accordance with the gray level. Hence, it is possible to correct the luminance of the light-emitting element L1 in accordance with a temporal change. In FIG. 11, "START" is when a video display is started on the basis of a video signal. The correction processing unit 15 and the display control unit 16 perform the flow chart shown in FIG. 11 for each of the pixel circuits 3.

In step S1101, the correction processing unit 15 acquires a video signal for one of the pixel circuits 3. In step S1102, the correction processing unit 15 obtains a data voltage value that corresponds to the gray level in the video signal. In step S1103, the correction processing unit 15 retrieves the correction value 140 from the memory 14. Next, in step S1104, the correction processing unit 15 performs a temperature-dependent adjustment on the correction value 140.

The electric current conductivity of the light-emitting element L1 and the drive transistor T2 changes with the temperature of the display panel 2. Accordingly, the correction processing unit 15 changes the correction value 140 in accordance with the temperature of the display panel 2. For example, the correction processing unit 15 decreases the correction value 140 with an increase in the temperature of the display panel 2 and increases the correction value 140 with a decrease in the temperature of the display panel 2. Hence, it is possible to produce a display with suitable luminance.

The memory 14 may contain, in a non-volatile fashion, adjustment-use table data 142 in which an adjustment quantity for the correction value 140 to be contained in the memory 14 is defined for different temperatures (see FIG. 1). The correction processing unit 15 determines an adjustment quantity for the correction value 140 on the basis of the temperature recognized, by referring to the adjustment-use table data 142. The correction processing unit 15 may obtain the correction value 140 adjusted in accordance with temperature, by adding the adjustment quantity to the retrieved correction value 140 or subtract the adjustment quantity from the retrieved correction value 140.

Alternatively, the memory 14 may contain a temperature correction coefficient 143 for different temperatures in a non-volatile fashion (see FIG. 1). In such a case, the correction processing unit 15 recognizes the temperature of the display panel 2 on the basis of the output of the temperature sensor 11. Then, the correction processing unit 15 determines the temperature correction coefficient 143 to be used on the basis of the recognized temperature. The correction processing unit 15 may determine the correction value 140 adjusted in accordance with temperature, by multiplying the retrieved correction value 140 by the determined temperature correction coefficient 143.

Then, in step S1105, the correction processing unit 15 corrects the data voltage value on the basis of the correction value 140 adjusted in accordance with temperature, to obtain the correction voltage value V1. For example, if the correction value 140 is a value to be added, the correction processing unit 15 adds the correction value 140 adjusted in accordance with temperature to the data voltage value. If the correction value 140 is a multiplication coefficient, the correction processing unit 15 multiplies the data voltage value by the correction value 140 adjusted in accordance with temperature.

The display device 1 includes the memory 14. As described above, the correction value computation unit 13, when the characteristics measuring unit 12 has obtained a measurement value, determines the correction value 140 on the basis of the measurement value. The memory 14 contains the correction value 140 determined by the correction value computation unit 13 in a non-volatile fashion. When the correction voltage value V1 is to be obtained to produce a display based on a video signal, the correction processing unit 15 obtains the correction voltage value V1 on the basis of the correction value 140 contained in the memory in a non-volatile fashion. Hence, it is possible to obtain the correction voltage value V1 by using the correction value 140 that is stored in advance. It takes less calculation to obtain the correction voltage value V1, compared to when a measurement value is retrieved upon the start of video signal inputs to obtain a correction value on the basis of the measurement value. It takes minimum calculation in producing a display.

As described here, the characteristics measuring unit 12 obtains a measurement value for each of the pixel circuits 3. The correction value computation unit 13 determines the correction value 140 for each of the pixel circuits 3. The correction processing unit 15 obtains the correction voltage value V1 for each of the pixel circuits 3 on the basis of the correction value 140 for each of the pixel circuits 3. Hence, the resultant display device 1 is capable of maintaining high image quality and producing an easy-to-see display. It is possible to properly correct the luminance of the light-emitting element L1 for each of the pixel circuits 3.

In step S1106, the correction processing unit 15 outputs the correction voltage value V1 to the display control unit 16. Then, in step S1107, the display control unit 16 causes a display output on the basis of the correction voltage value V1. Specifically, the display control unit 16 transmits the correction voltage value V1 to the data line drive circuit 23 to cause the data voltage Vd of which the magnitude is equal to the correction voltage value V1 to be applied to the data line D of the associated one of the pixel circuits 3. The light-emitting element L1 emits light on the basis of the correction voltage value V1.

First Variation Example

Figure 12:
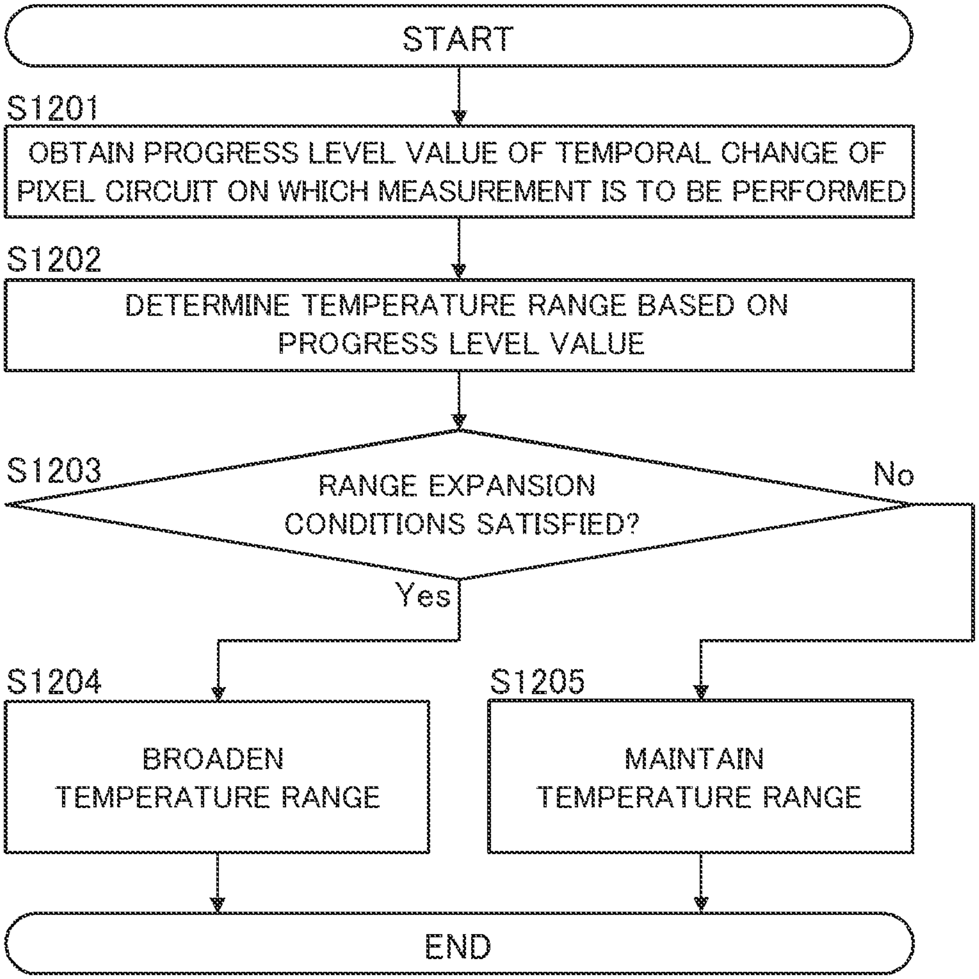
FIG. 12 is a diagram of an exemplary temperature range setting process in a display device in accordance with a first variation example.

A description is given next of a first variation example with reference to FIG. 12. FIG. 12 is a diagram of an exemplary temperature range setting process in the display device 1 in accordance with the first variation example.

The embodiment has described an example where the temperature range in which measurement is performed is fixed. In the first variation example, the temperature range is changed in accordance with conditions such as the progress of temporal changes and the settings of the correction value 140. Note that the first variation example is otherwise the same as the embodiment. Description of these features that are common with the embodiment is omitted.

In FIG. 12, "START" is when step S801 in FIG. 8 is completed. In step S1201, the characteristics measuring unit 12 obtains, on the basis of the correction value 140, a progress level value for the temporal changes in the pixel circuit 3 on which measurement is to be performed now. In step S1202, the characteristics measuring unit 12 determines a temperature range on the basis of the progress level value. Specifically, the characteristics measuring unit 12 narrows down the temperature range with the progress of temporal changes. If the temperature range is broadened when temporal changes have well progressed, the correction value 140 will more likely be determined with large error. When temporal changes have progressed, the temperature range can be deliberately narrowed down. For example, a temperature range where the correction value 140 has small error may be appreciated in accordance with the progress of temporal changes on the basis of an experiment. Hence, it is possible to perform measurement in a temperature range that is reduced in accordance with the progress of temporal changes so that the correction value 140 has small error. On the other hand, the temperature range is deliberately broadened before temporal changes progress. It is possible to increase instances of measurement and setting of the correction value 140.

Here, the correction value 140 can increase with the progress of temporal changes. Accordingly, the characteristics measuring unit 12 may obtain, as the progress level value, an average value of the correction values 140 for the pixel circuits 3 in a group on which measurement is to be performed. Alternatively, the characteristics measuring unit 12 may obtain the progress level value by using another technique and/or another numerical value.

The memory 14 may contain, in a non-volatile fashion, a temperature range determining table data 144 in which temperature ranges are defined in relation to the progress level value (see FIG. 1). Specifically, in the temperature range determining table data 144, a narrower temperature range is determined as temporal changes progress (as the progress level value increases). The characteristics measuring unit 12 may obtain a temperature range by referring to the temperature range determining table data 144.

Here, in the temperature range determining table data 144, the temperature range may have a fixed upper limit. Then, the temperature range may have different lower limits in relation to the progress level value. In other words, when the temperature range is to be changed, the characteristics measuring unit 12 may fix the upper limit of the temperature range and change only the lower limit thereof. It is possible to narrow down the temperature range in the direction of increasing the threshold on the low temperature end. When temporal changes have progressed, it is possible to prevent measurement at low temperatures and prevent the electric current to be measured from excessively decreasing. It is possible to restrain obtaining the correction value 140 with large error.

In step S1203, the characteristics measuring unit 12 determines whether or not the pixel circuit 3 on which measurement is to be performed now satisfies range expansion conditions. When the range expansion conditions are satisfied, the characteristics measuring unit 12, in step S1204, broadens the temperature range determined in step S1202 (END). For example, the characteristics measuring unit 12 may increase the upper limit of the temperature range by a predetermined amount of change. Alternatively, the characteristics measuring unit 12 may decrease the lower limit of the temperature range by a predetermined amount of change. The amount of change may be determined in the range of a few degrees Celsius to 10 degrees Celsius. If the range expansion conditions are not satisfied, the characteristics measuring unit 12, in step S1205, maintains the temperature range determined in step S1202 (END).

For instance, one of the range expansion conditions is that the time that has elapsed since the correction value 140 was previously determined exceeds a predetermined reference duration of time in relation to the pixel circuit 3 on which measurement is to be performed. When this is the case, the correction value computation unit 13 stores, in the memory 14, the date and time when the correction value 140 is determined as well as the correction value 140 for each of the pixel circuits 3.

Specifically, the characteristics measuring unit 12 broadens the temperature range for a second case relative to the temperature range for a first case. Specifically, the first case is a case where there are no pixel circuits 3 for which the time that has elapsed since the correction value 140 was previously obtained exceeds a predetermined reference duration of time. The second case is a case where there are pixel circuits 3 for which the time that has elapsed since the correction value 140 was previously obtained exceeds the reference duration of time. The correction value 140 is preferably continuously updated with the progress of temporal changes. By broadening the temperature range, it is possible to increase instances of measurement and setting of the correction value in relation to the pixel circuits 3 for which the correction value 140 has not been updated for an extended period of time.

Second Variation Example

The embodiment and the first variation example have described an example where in measurement, the characteristics measuring unit 12 applies a voltage with a prescribed magnitude to the pixel circuit 3 (data line D). However, the characteristics measuring unit 12 may obtain the magnitude of the data voltage Vd at which the electric current that flows in the light-emitting element L1 has a prescribed magnitude. In other words, the characteristics measuring unit 12 may measure voltage, not electric current, as characteristics. The memory 14 may contain a data table in which the correction value 140 is defined for the magnitude of the data voltage Vd obtained. The correction value computation unit 13 may obtain the correction value 140 by referring to this data table. In addition, the correction value computation unit 13 may obtain the correction value 140 by performing a prescribed computation on the data voltage Vd obtained.

Third Variation Example

Figure 13:
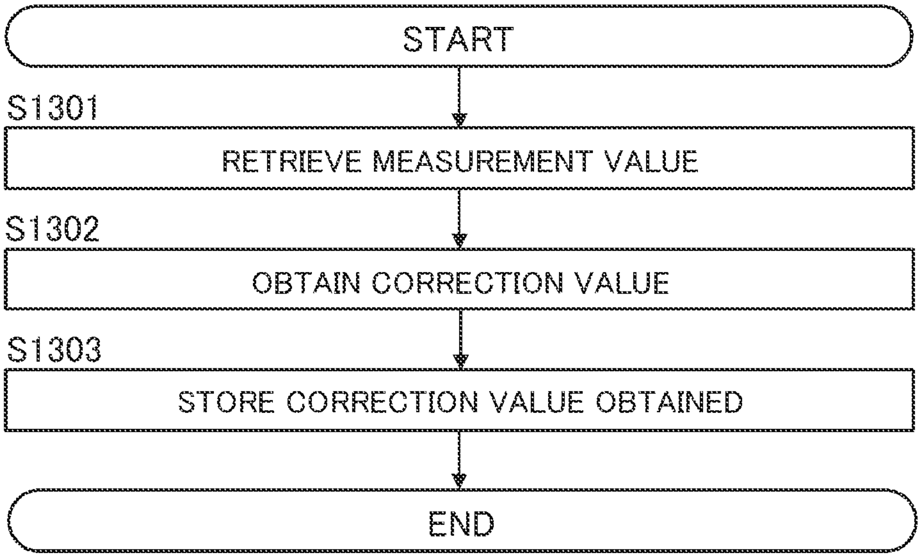
FIG. 13 is a diagram of an exemplary video signal correction process in accordance with a third variation example.

A description is given next of a third variation example with reference to FIG. 13. FIG. 13 is a diagram of an exemplary video signal correction process in the display device 1 in accordance with the third variation example.

The embodiment described an example where after measurement, the correction value 140 is immediately obtained for each of the pixel circuits 3 so that the correction value 140 obtained can be stored in the memory 14 in a non-volatile fashion. In the third variation example, the memory 14 contains a measurement value, not the correction value 140, for each of the pixel circuits 3 in a non-volatile fashion. The third variation example differs from the embodiment and each variation example in that in the former, a correction value is obtained on the basis of a measurement value upon starting a video display. For example, upon starting a display in response to the operation unit receiving the turning-on of the power supply for the display device 1, the correction value computation unit 13 obtains the correction value 140 on the basis of a measurement value. Note that the third variation example is otherwise the same as the embodiment. Description of these features that are common with the embodiment is omitted.

Specifically, in the third variation example, in the flow chart in FIG. 8, the correction value computation unit 13 does not carry out step S807 and step S808. Instead, the characteristics measuring unit 12 causes the memory 14 to store the measurement value obtained in the measurement for each of the pixel circuits 3.

Referring to FIG. 13, a description is given of an example of correcting a video signal (magnitude of a data voltage) based on the measurement value stored in a non-volatile fashion. In FIG. 13, "START" is when a video display is started on the basis of a video signal. In the flow chart in FIG. 13, the correction value computation unit 13 may obtain the correction value 140 for all the pixel circuits 3.

First, in step S1301, the correction value computation unit 13 retrieves the measurement value stored in the memory 14 in a non-volatile fashion for each of the pixel circuits 3. Next, in step S1302, the correction value computation unit 13 determines the correction value 140 for each of the pixel circuits on the basis of the retrieved measurement value. The correction value 140 may be determined by the same method as in step S807 in FIG. 8.

In step S1303, the correction value computation unit 13 causes the memory 14 to store the correction value 140 obtained for each of the pixel circuits 3 (all the pixel circuits 3). In the third variation example, for example, the correction value computation unit 13 causes an RAM in the memory 14 to store the correction value 140, instead of causing the correction value 140 to be stored in a non-volatile fashion.

After the correction value 140 is obtained for each of the pixel circuits 3, the correction processing unit 15 performs the process represented in the flow chart in FIG. 11 on each of the pixel circuits 3. For example, the correction processing unit 15 sequentially acquires a video signal for the pixel circuits 3. Then, the correction processing unit 15 obtains a data voltage value that corresponds to the gray level in the video signal for each of the pixel circuits 3. Next, the correction processing unit 15 performs temperature-dependent adjustment on the correction value 140 for each of the pixel circuits 3. Then, the correction processing unit 15 corrects the data voltage value for each of the pixel circuits 3 on the basis of the correction value 140 adjusted in accordance with temperature, to obtain the correction voltage value V1 for each of the pixel circuits 3.

As described here, the memory 14 may store the measurement value obtained by the characteristics measuring unit 12 in a non-volatile fashion. Upon starting a display based on a video signal, the correction value computation unit 13 may determine the correction value 140 on the basis of a measurement value stored in a non-volatile fashion. The correction processing unit 15 may obtain the correction voltage value V1 on the basis of the correction value 140 determined by the correction value computation unit 13. In some cases, the measurement value may have a smaller data amount than the correction value 140. In such cases, it is possible to restrain the size of the data stored in the memory 14 if the measurement value is stored instead of the correction value 140 as in the third variation example. It is possible to restrain the size of the non-volatile memory in the display device 1. It is possible to restrain the manufacturing cost of the display device 1.

Fourth Variation Example

Figure 14:
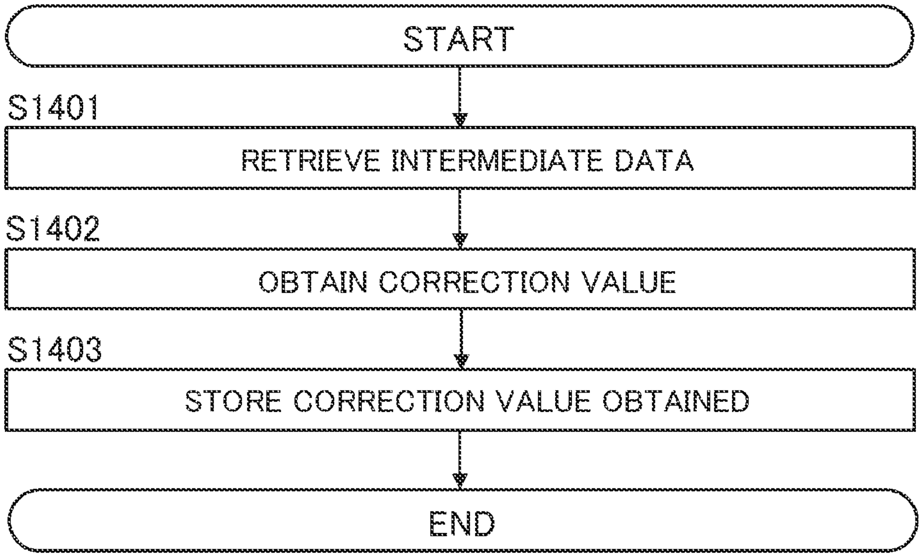
FIG. 14 is a diagram of an exemplary video signal correction process in accordance with a fourth variation example.

A description is given next of a fourth variation example with reference to FIG. 14. FIG. 14 is a diagram of an exemplary video signal correction process in the display device 1 in accordance with the fourth variation example.

The embodiment described an example where after measurement, the correction value 140 is immediately obtained for each of the pixel circuits 3 so that the correction value 140 obtained can be stored in the memory 14 in a non-volatile fashion. The third variation example described an example where the memory 14 stores a measurement value in a non-volatile fashion, and the correction value 140 is obtained upon starting a video display. However, in some cases, the data up to somewhere in the process of the correction computation may have a smaller data size than either the correction value 140 or measurement value. Throughout the following, the data (numerical value) available partway through the computation (correction computation) up to the obtaining of the correction value 140 from a measurement value will be referred to as the intermediate data.

In the fourth variation example, the memory 14 stores, instead of the correction value 140, intermediate data that is based on a measurement value for each of the pixel circuits 3 in a non-volatile fashion. The fourth variation example differs from the embodiment and each variation example in that in the former, a correction value is obtained on the basis of the intermediate data upon starting a video display. For example, upon starting a display in response to the operation unit receiving the turning-on of the power supply for the display device 1, the correction value computation unit 13 obtains the correction value 140 for each of the pixel circuits 3 on the basis of the intermediate data. Note that the fourth variation example is otherwise the same as the embodiment and each variation example. Description of these features that are common with the embodiment and each variation example is omitted.

Specifically, in the fourth variation example, in the flow chart in FIG. 8, the correction value computation unit 13 does not perform step S807 and step S808. Instead, the correction value computation unit 13 computes the measurement value obtained in the measurement, to obtain intermediate data, for each of the pixel circuits 3. The correction value computation unit 13 causes the memory 14 to store the obtained intermediate data in a non-volatile fashion. Note that in some cases, a plurality of numerical values may be obtained in the process of computation of obtaining the correction value 140 from a measurement value. In other words, in some cases, the correction value computation unit 13 sequentially performs a plurality of computation formulas in determining the correction value 140 for one of the pixel circuits 3. In such cases, the correction value computation unit 13 may cause the memory 14 to store, as the intermediate data, one of the numerical values obtained from the plurality of computation formulas that has a minimum data size.

Referring to FIG. 14, a description is given of an example of correcting a video signal (magnitude of a data voltage) based on the intermediate data stored in a non-volatile fashion. In FIG. 14, "START" is when a video display is started on the basis of a video signal. In the flow chart in FIG. 14, the correction value computation unit 13 may obtain the correction value 140 for all the pixel circuits 3.

First, in step S1401, the correction value computation unit 13 retrieves the intermediate data stored in the memory 14 in a non-volatile fashion for each of the pixel circuits 3. Next, in step S1402, the correction value computation unit 13 determines the correction value 140 for each of the pixel circuits on the basis of the retrieved intermediate data. The correction value 140 may be determined by the same method as in step S807 in FIG. 8.

In step S1403, the correction value computation unit 13 causes the memory 14 to store the correction value 140 obtained for each of the pixel circuits 3 (all the pixel circuits 3). In the fourth variation example, for example, the correction value computation unit 13 causes an RAM in the memory 14 to store the correction value 140, instead of causing the correction value 140 to be stored in a non-volatile fashion.

As described here, when the characteristics measuring unit 12 has obtained a measurement value, the correction value computation unit 13 may obtain intermediate data that is data obtained during the course of the computation of determining the correction value 140 from the measurement value. The correction value computation unit 13 may cause the memory 14 to store the intermediate data in a non-volatile fashion. Upon starting a display that is based on a video signal, the correction value computation unit 13 may determine the correction value 140 for each of the pixel circuits 3 on the basis of the intermediate data stored in a non-volatile fashion. In such a case, the correction processing unit 15 may obtain the correction voltage value V1 using the correction value 140 determined on the basis of the intermediate data. It is possible to restrain the size of data used for the purpose of luminance adjustment, by storing the intermediate data as the data stored in the memory 14 in a non-volatile fashion. It is possible to restrain the size of the non-volatile memory in the display device 1. It is possible to restrain the manufacturing cost of the display device 1.

The invention claimed is:

1. A display device comprising:

a display panel including a plurality of pixel circuits;

a temperature sensor configured to measure a temperature of the display panel;

a characteristics measuring unit configured to obtain a measurement value related to a characteristic of an element in the plurality of pixel circuits by passing an electric current through the plurality of pixel circuits;

a correction value computation unit configured to determine a correction value for a temporal change based on the measurement value;

a correction processing unit configured to obtain a correction voltage value by correcting a video signal based on the correction value; and a display control unit configured to cause a voltage that has a value equal to the correction voltage value to be applied to the plurality of pixel circuits, wherein the plurality of pixel circuits includes:

a light-emitting element, as the element; and a drive transistor configured to control an electric current that flows in the light-emitting element, and the characteristics measuring unit is further configured to:

obtain the measurement value when the temperature is in a predetermined temperature range, forgo obtaining the measurement value when the temperature is out of the predetermined temperature range, obtain, based on the correction value, a progress level value for a temporal change of the plurality of pixel circuits on which a measurement is to be performed, and narrow down the predetermined temperature range with a progress of the temporal change.

2. The display device according to claim 1, wherein the characteristics measuring unit is further configured to broaden the predetermined temperature range for a second case relative to the predetermined temperature range for a first case, the first case is a case that, in none of the plurality of pixel circuits, time, that has elapsed since the correction value was previously obtained, exceeds a predetermined reference duration of time, and the second case is a case that, in at least one of the plurality of pixel circuits, the time, that has elapsed since the correction value was previously obtained, exceeds the predetermined reference duration of time.

3. The display device according to claim 1, wherein, when the predetermined temperature range is to be changed, the characteristics measuring unit is further configured to fix an upper limit of the predetermined temperature range and change a lower limit of the predetermined temperature range.

4. The display device according to claim 1, wherein the characteristics measuring unit is further configured to obtain the measurement value for each of the plurality of pixel circuits, the correction value computation unit is further configured to determine the correction value for each of the plurality of pixel circuits, and the correction processing unit is further configured to obtain the correction voltage value for each of the plurality of pixel circuits based on the correction value for each of the plurality of pixel circuits.

5. The display device according to claim 1, wherein the plurality of pixel circuits further includes a measurement-use switch, and when the measurement value is to be obtained, the characteristics measuring unit is further configured to control the measurement-use switch, such that to pass an electric current through the drive transistor, and such that to forgo passing an electric current through the light-emitting element, to obtain the measurement value based on the electric current that has been passed through the drive transistor.

6. The display device according to claim 1, wherein the plurality of pixel circuits further includes a measurement-use switch, and when the measurement value is to be obtained, the characteristics measuring unit is further configured to control the measurement-use switch, such that to forgo passing an electric current through the drive transistor, and such that to pass an electric current through the light-emitting element, to obtain the measurement value based on the electric current that has been passed through the light-emitting element.

7. The display device according to claim 5, further comprising:

a data line configured to apply a voltage to a gate of the drive transistor;

a write control transistor configured to, when turned on, connect the data line to the gate of the drive transistor; and a scan line connected to a gate of the write control transistor to control turning on and off of the write control transistor, wherein the measurement-use switch has one of terminals thereof connected to the data line and another one of the terminals thereof connected to a source of the drive transistor and to an anode of the light-emitting element, when an electric current flows through the drive transistor, but no electric current flows through the light-emitting element, the characteristics measuring unit is further configured to turn on the drive transistor and the measurement-use switch to obtain the measurement value based on an electric current that flows to the data line via the drive transistor and the measurement-use switch, and when an electric current flows through the light-emitting element, but no electric current flows through the drive transistor, the characteristics measuring unit is further configured to turn off the write control transistor and the drive transistor and turn on the measurement-use switch to obtain the measurement value based on an electric current that flows to the light-emitting element via the data line and the measurement-use switch.

8. The display device according to claim 1, further comprising a memory, wherein when the characteristics measuring unit has obtained the measurement value, the correction value computation unit is further configured to determine the correction value based on the measurement value, the memory stores the correction value determined by the correction value computation unit in a non-volatile fashion, and when the correction voltage value is to be obtained to produce a display based on the video signal, the correction processing unit is further configured to obtain the correction voltage value based on the correction value stored in the memory in the non-volatile fashion.

9. The display device according to claim 1, further comprising a memory, wherein the memory stores the measurement value obtained by the characteristics measuring unit in a non-volatile fashion, and when a display based on the video signal is to be started, the correction value computation unit is further configured to determine the correction value based on the measurement value stored in the non-volatile fashion, and the correction processing unit is further configured to obtain the correction voltage value based on the correction value determined by the correction value computation unit.

10. The display device according to claim 1, further comprising a memory, wherein when the characteristics measuring unit has obtained the measurement value, the correction value computation unit is further configured to obtain, based on the measurement value, intermediate data that is data available partway through computation of determining the correction value, the memory stores the intermediate data obtained by the correction value computation unit in a non-volatile fashion, and when a display based on the video signal is to be started, the correction value computation unit is further configured to determine the correction value based on the intermediate data stored in the non-volatile fashion, and the correction processing unit is further configured to obtain the correction voltage value based on the correction value determined by the correction value computation unit.

* * * * *